United States Patent [19]
Itoh et al.

[11] Patent Number: 5,790,510
[45] Date of Patent: Aug. 4, 1998

[54] OPTICAL COMPONENT DRIVE DEVICE INCLUDING NONPARALLEL ELASTIC PLATES

[75] Inventors: Hirokazu Itoh; Tomohiro Makigaki, both of Suwa, Japan

[73] Assignee: Seiko Epson Corporation, Tokyo, Japan

[21] Appl. No.: 683,360

[22] Filed: Jul. 18, 1996

Related U.S. Application Data

[63] Continuation of Ser. No. 256,518, PCT/JP93/01642 filed Nov. 10, 1993, abandoned.

[30] Foreign Application Priority Data

Nov. 12, 1992 [JP] Japan ................... 4-302633

[51] Int. Cl.$^6$ ........................................ G11B 7/09
[52] U.S. Cl. .............................. 369/244; 369/44.16
[58] Field of Search ........................ 369/244, 247, 369/44.15, 44.16, 44.22, 44.32, 44.14

[56] References Cited

U.S. PATENT DOCUMENTS

| | | | |
|---|---|---|---|
| 4,135,083 | 1/1979 | Van Alem et al. | 250/201 |
| 4,538,882 | 9/1985 | Tanaka et al. | 350/255 |
| 5,414,680 | 5/1995 | Ikegame | 369/44.15 |

FOREIGN PATENT DOCUMENTS

| | | |
|---|---|---|
| 0 464 912 A1 | 1/1992 | European Pat. Off. . |
| 60-29945 | 2/1985 | Japan . |
| 60-76040 | 4/1985 | Japan . |
| 60-129937 | 7/1985 | Japan . |
| 60-138745 | 7/1985 | Japan . |
| 60-175226 | 9/1985 | Japan . |
| 61-131243 | 6/1986 | Japan . |
| 61-296536 | 12/1986 | Japan . |
| 63-224039 | 9/1988 | Japan . |
| 4-147441 | 5/1992 | Japan . |
| 2 202 405 | 9/1988 | United Kingdom . |
| WO 93/08566 | 4/1993 | WIPO . |

*Primary Examiner*—Stuart S. Levy
*Assistant Examiner*—Kevin M. Watkins
*Attorney, Agent, or Firm*—Oliff & Berridge, PLC

[57] ABSTRACT

The present invention is applied to a device for driving optical component parts, such as an objective lens, in accordance with displacement of a disk. A mobile body, on which the optical component parts are mounted, is supported by at least two plate springs that are not parallel with the disk, in such a manner that the mobile body can be driven in a focusing direction and a tracking direction. The plate springs can have an electric wiring function so that no wires extend from the mobile body.

46 Claims, 19 Drawing Sheets

OPTICAL COMPONENT DRIVE DEVICE INCLUDING NONPARALLEL ELASTIC PLATES

This is a Continuation of application Ser. No. 08/256,518 filed Jul. 8, 1994, now abandoned, which in turn is a 371 of PCT/JP93/01642 filed Nov. 10, 1993.

FIELD OF THE INVENTION

The present invention relates to an optical drive device provided in an optical recording and reproduction apparatus for driving optical component parts, such as an objective lens, in accordance with displacement of a disk. Particularly, the present invention relates to a device for driving optical component parts that includes plate springs that are used to drive the optical component parts in focusing and tracking directions, and that may have an electric wiring function, the drive device thus being made simple and made to include a mobile body of reduced weight, so as to be capable of stably driving the optical component parts at high speed.

DESCRIPTION OF RELATED ART

A conventional optical recording and reproduction apparatus has an optical component parts drive device of varying type in which plate springs are employed. In such an optical component parts drive device, two pairs of plate springs support a mobile body, as disclosed, for example, in Japanese Patent Publication No. 62-20903.

In this example, however, it is essential to provide intermediary supporting members in order to tie together the two pairs of plate springs which are in turn necessary to support the mobile body in such a manner that the mobile body can be moved in two directions. This requirement hinders the weight of the mobile body from being reduced. In addition, the complicated structure makes dynamic characteristics unstable.

When optical elements, such as a light-emitting element and a light-receiving element, are integrated with the mobile body, the inevitable need to provide electric wires for these elements makes the structure more complicated and makes dynamic characteristics more unstable.

SUMMARY OF THE INVENTION

An optical component parts drive device according to the present invention includes: a mobile body having optical component parts for radiating a spot of light onto a recording surface of a disk on which information is recorded, and also having a holder for retaining the optical component parts; driving means for driving the mobile body in two directions comprising a radial direction of the disk and a direction perpendicular to a plane defined by the surface of the disk; and supporting means for supporting the mobile body. The drive device is characterized in that the supporting means comprises at least four elastic plate springs, the plate springs having widths directed at an arbitrarily selected angle with respect to the plane defined by the disk.

The plate springs may be integral with wires for conveying various signals.

DETAILED DESCRIPTION OF PREFERRED EMBODIMENTS

Figure 1:
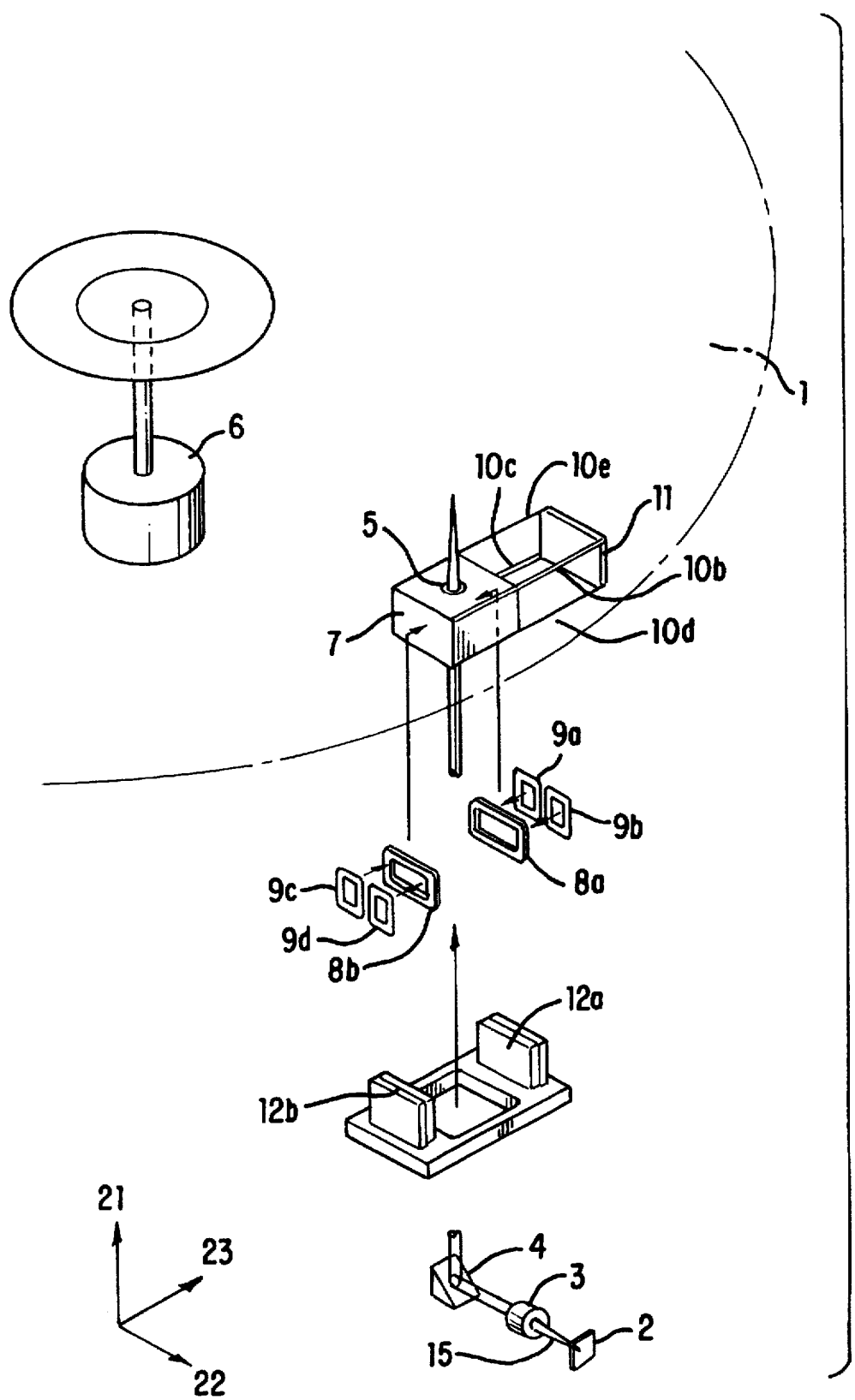
FIG. 1 is a perspective view showing a first embodiment of the present invention.

FIG. 1 shows a first embodiment of the present invention. Light 15 generated from a light source 2 is made into a parallel beam by a collimating lens 3. Thereafter, the parallel beam is refracted by an optical path deflecting means 4 in a direction perpendicular to a plane defined by a surface of a disk 1, propagates through an objective lens 5, and forms a light spot on a desired position of a recording surface of the disk. The disk 1, however, may be displaced in a radial direction (hereinafter referred to as "tracking direction"; indicated by an arrow 22) and a direction perpendicular to the plane defined by the disk (hereinafter referred to as "focusing direction"; indicated by an arrow 21) when influenced by vibration of a spindle connected to a spindle motor 6, and/or the eccentricity or the surface waving of the disk itself. Therefore, a mobile body having the objective lens 5 is driven in accordance with such displacement.

The mobile body includes the objective lens 5, a holder 7 for retaining the objective lens, first coils 8a and 8b for driving the mobile body in a focusing direction, and second coils 9a to 9d for driving the mobile body in a tracking direction.

Figure 2A:
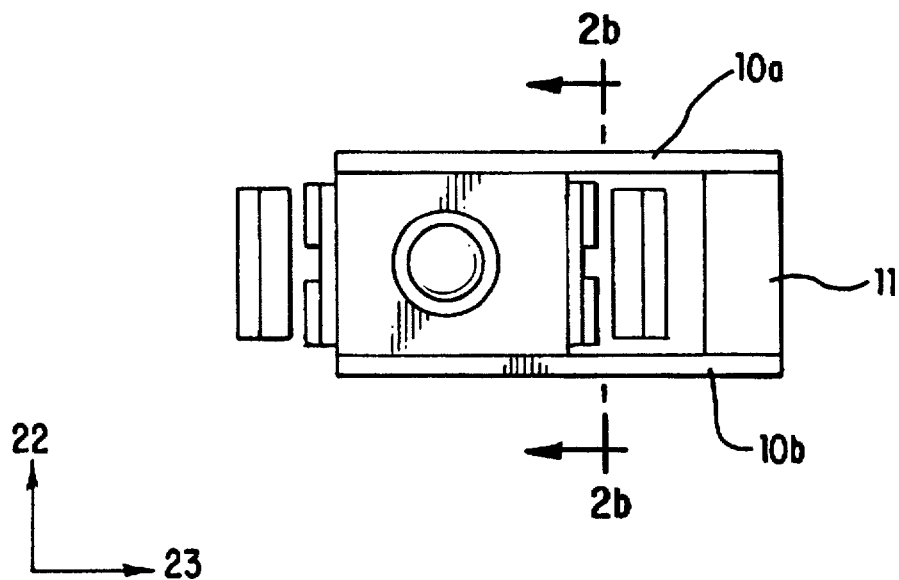
FIG. 2(a) is an upper plan view showing the first embodiment of the present invention.
Figure 2B:
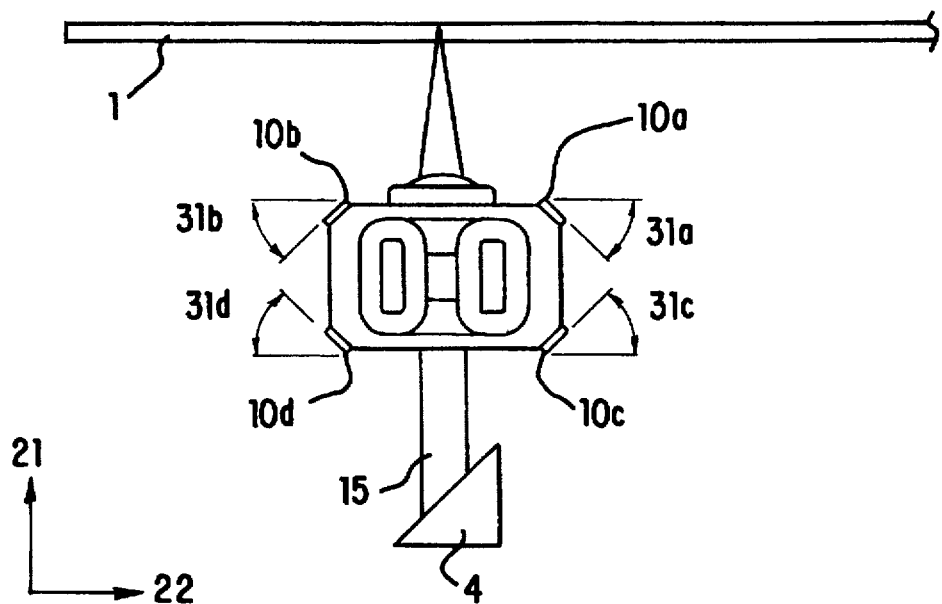
FIG. 2(b) is a sectional view taken along line 2b—2b shown in FIG. 2(a)
Figure 3A:
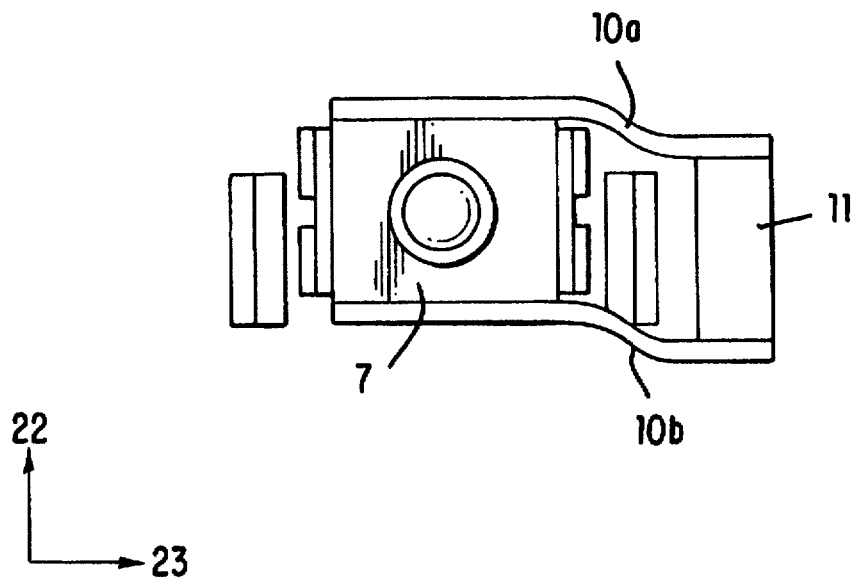
FIG. 3(a) is an upper plan view showing a driven state of the first embodiment of the present invention.
Figure 3B:
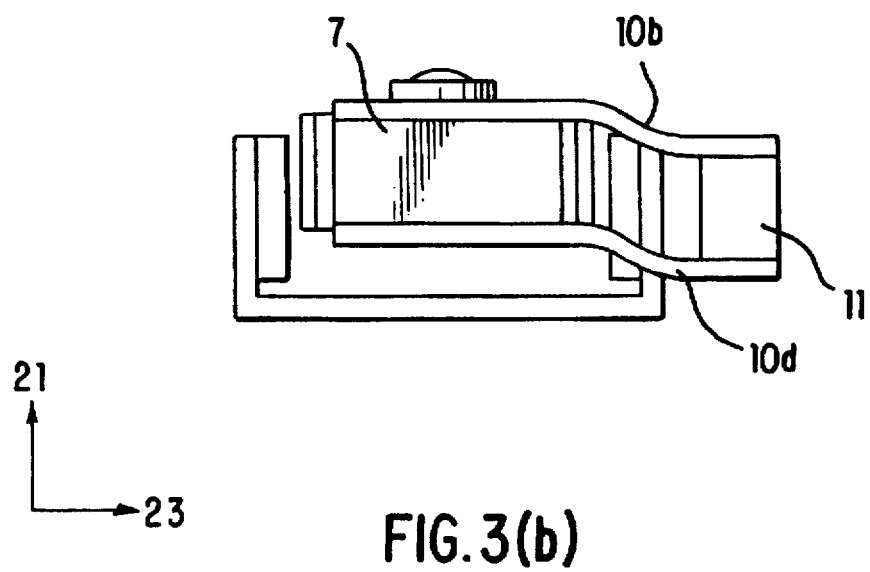
FIG. 3(b) is a side view showing a driven state of the first embodiment of the present invention.

As shown in FIGS. 2(a) and 2(b), the mobile body is supported by first end portions of four plate springs 10a to 10d having elasticity. The plate springs 10a to 10d have widths that are directed at arbitrarily selected angles 31a to 31d, respectively, with respect to a plane defined by the disk 1. The second end portions of the plate springs 10a to 10d are fixed to a base 11. As a result, the four plate springs are able to bend in the two directions, i.e., a focusing direction and a tracking direction, as shown in FIGS. 3(a) and 3(b); thus, the mobile body is able to move in these two directions. The provision of the angles 31a–31d serves to improve the rigidity of the plate springs against the movement of the mobile body in directions other than the above two directions, such as a tangential direction of the disk.

The material and the shape of the plate springs 10 will be described. A material for forming the plate springs is preferably an elastic metal material such as stainless steel, phosphor bronze or beryllium copper. Each plate spring has a substantially rectangular or trapezoidal cross-sectional configuration having a thickness of 0.005 to 1 mm and a width of 0.1 to 2 mm. Although the plate springs 10a–10d may be made of a plastic material, the use of a metal material, as described above, is advantageous in terms of temperature characteristics and changes with the passage of time.

Next, the angles 31a–31d will be described. The magnitude of the angles 31a–31d determines a spring constant for the focusing direction and for the tracking direction. That is, the closer to 0 degrees the value of the angles 31a–31d, the smaller the spring constant for the focusing direction and the greater the spring constant for the tracking direction. On the other hand, the closer to 90 degrees the value of the angles 31a–31d, the greater the spring constant for the focusing direction and the smaller the spring constant for the tracking direction. Since the spring constants are very significant to the dynamic characteristics of the mobile body in the focusing and tracking directions, the values of the angles 31a–31d that determine these constants are important. It is advantageous if the four angles are of substantially equal values that range from 25 to 65 degrees.

Figure 4:
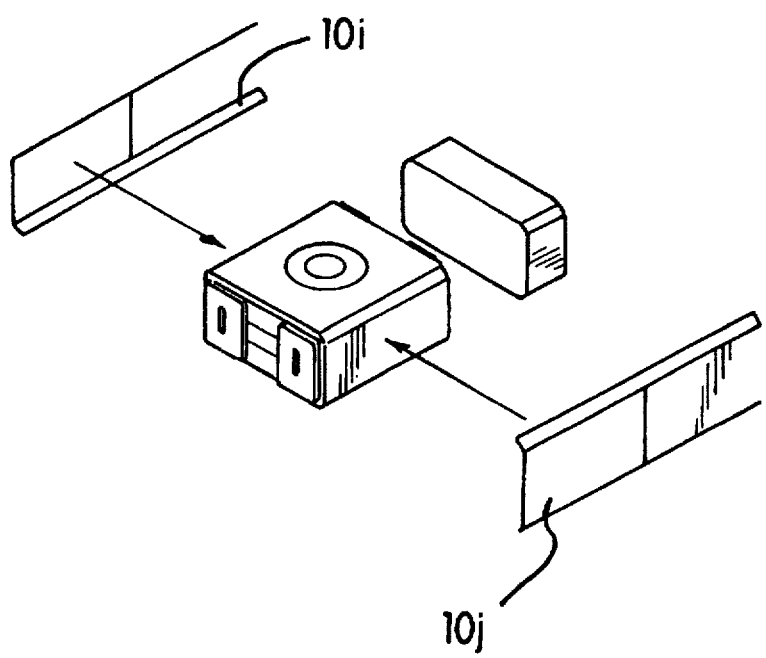
FIG. 4 is a perspective view showing examples of plate springs that may be incorporated in the first embodiment of the present invention.

In the embodiment being illustrated, four plate springs support the mobile body. However, such four plate springs may be provided by using, e.g., two members 101, as shown in FIG. 4, thereby obtaining similar effect.

Next, driving means will be described. As shown in FIG. 1, the first coils 8a and 8b for driving the mobile body in a focusing direction have a hollow elongated-circular shape, and are able to generate a driving force in a focusing direction through an electromagnetic action involving magnetic flux generated by opposed magnets 12a–12b. Each of the first coils 8a and 8b is secured to one of the end faces of the holder 7 which oppose each other in a tangential direction of the disk, so as to drive the mobile body in a focusing direction with a driving force described above. The second coils 9a–9d for driving the mobile body in a tracking direction have a hollow elongated-circular shape, as in the case of the first coils 8a–8b, and are capable of driving the mobile body through an electromagnetic action involving magnetic flux generated by the opposed magnets 12a–12b. Two pairs, in total, of the second coils 9a to 9d are secured to the two end faces of the holder 7, with each pair on one of the end faces, as in the case of the first coils. Magnets 12a and 12b constituting the above magnets are disposed on a stationary section with a certain gap between each of these magnets, on one hand, and a corresponding first coil 8a–8b and corresponding second coils 9a–9d, on the other.

Each of the first and second coils 8a–8b and 9a–9d comprises a coil of a metal wire mainly made of an electrically conductive material such as copper or aluminum. However, similar effect may be obtained by using an electrically conductive material, such as above, formed in patterns on an insulating sheet made of a polyimide resin, a polyurethane resin, or the like. Further, although in the embodiment described above, the first and second coils 8a–8b and 9a–9d are mounted on the holder 7 while the magnets 12a–12b are disposed on a stationary section, the magnets 12a–12b may be mounted on the holder 7 with the first and second coils 8a–8b and 9a–9d being disposed on a stationary section, thereby obtaining similar effect. Further, although in the above-described embodiment, driving in a focusing direction and driving in a tracking direction commonly employ the magnets 12a and 12b, driving operations in these two directions may employ individual magnets, and similar effect may be provided. Further, similar effect may be provided even when the first coils 8a–8b, the second coils 9a–9d, and the above patterns have substantially rectangular shapes.

Figure 5:
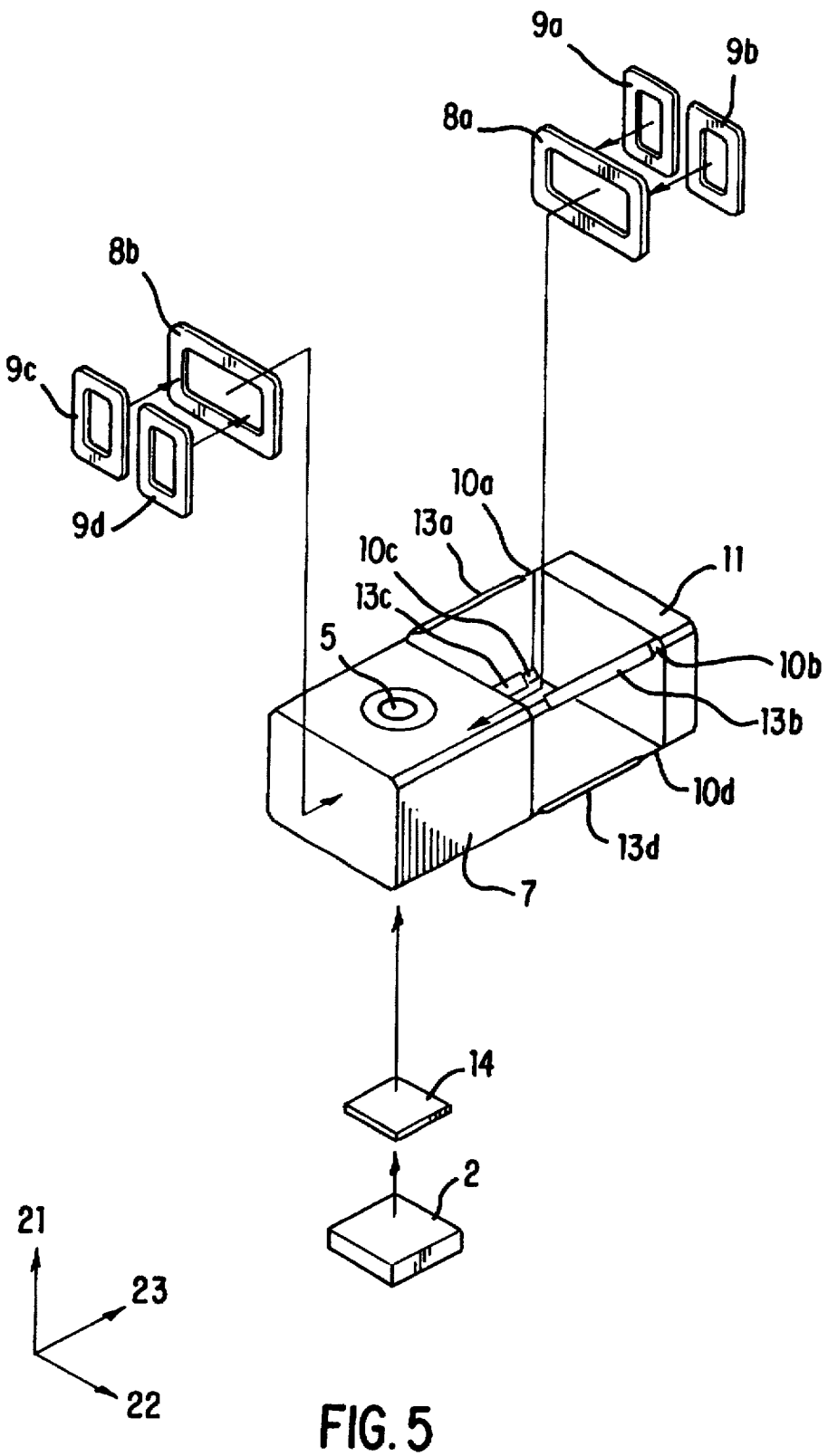
FIG. 5 is a perspective view showing a second embodiment of the present invention.

FIG. 5 shows a second embodiment of the present invention. Optical component parts, such as a light source 2, a light diffracting means 14 and an objective lens 5, are retained by a holder 7. A mobile body mainly comprises the holder 7, first coils 8a–8b for effecting driving in a focusing direction, and second coils 9a–9d for effecting driving in a tracking direction.

Light generated from the light source 2 transmits through the light diffracting means 14, and is thereafter condensed by the objective lens 5, forming a light spot on a recording surface of a disk. Since the series of optical component parts from the light source 2 to the objective lens 5 are mounted on the holder 7, no change occurs in the relative positions of the individual optical component parts even when the mobile body is displaced in a focusing or tracking direction.

The mobile body is supported by plate springs 10a–10d. Plate springs 10a to 10d constituting the above plate springs have widths directed at angles 31a–31d with respect to a plane defined by the surface of the disk. Damping members 13a to 13d having viscosity are attached to the plate springs 10a to 10d, respectively. The above construction provides effects similar to those provided by the first embodiment.

Figure 6:
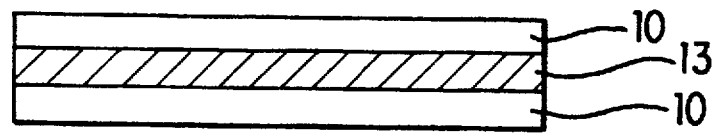
FIG. 6 is a sectional view showing a structure formed by a plate spring and a damping member.

The damping members 13a–13d will be described. The damping members 13a–13d are mainly made of a material such as silicone rubber, natural rubber, butyl rubber, or ether-containing polyurethane. When the plate springs 10a–10d receive excessive deformation energy caused by displacement of the mobile body, the damping members 13a–13d exhibit viscosity resistance such as to damp the energy. The damping members 13a–13d may be attached to substantially the entire surface of the plate springs 10a–10d. However, attaching to part of the plate springs also is effective. Further, a similar effect may be obtained by sandwiching a damping material 13 between two plate spring pieces 10, as shown in FIG. 6. A damping material may be sandwiched between portions of plate spring pieces, and still similar effect may be obtained.

Figure 7:
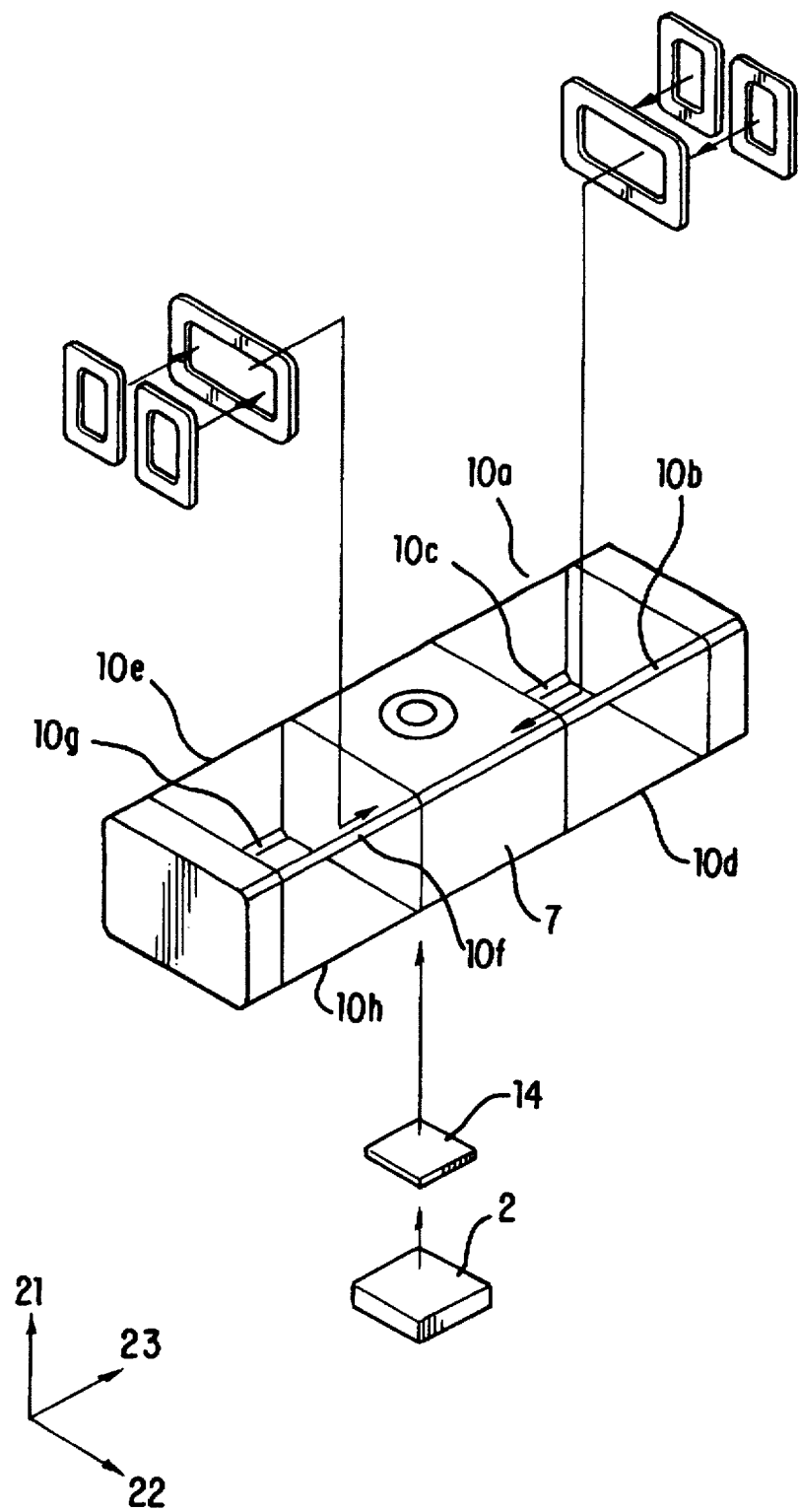
FIG. 7 is a perspective view showing a third embodiment of the present invention.

FIG. 7 shows a third embodiment of the present invention. A mobile body has a holder 7. Eight spring plates 10a to 10h, in total, have first ends attached to two end faces of the holder that oppose each other in a tangential direction 23 of a disk, with four spring plates being attached to each end face. The second ends of the plate springs 10a to 10h are fixed to a fixing member. The plate springs 10a to 10h thus disposed have widths directed at angles 31a–31d with respect to a plane defined by a surface of the disk. The above construction provides effects similar to those provided by the first embodiment. Similar effects may be provided even when paired ones of the plate springs, such as plate springs 10a and 10e, which have their longitudinal directions coinciding with each other, are formed as portions of a single plate spring member while the other six plate springs are similarly formed by using three plate spring members.

Figure 8A:
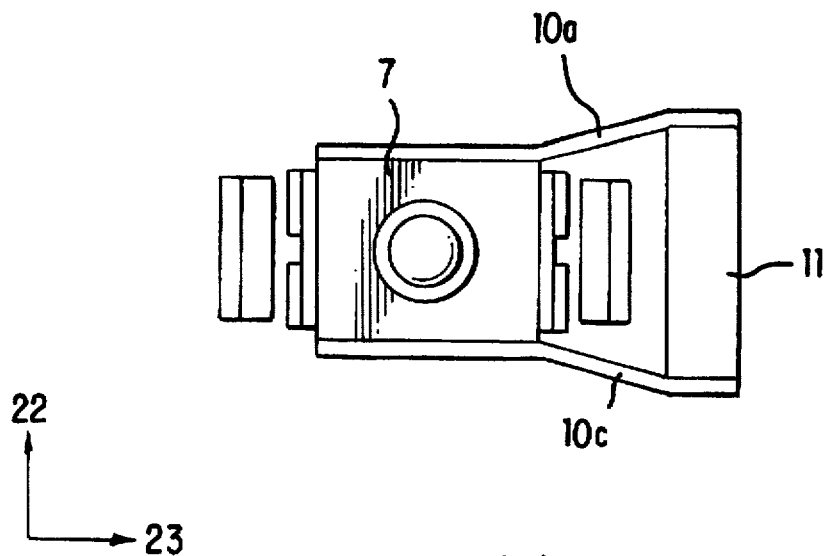
FIG. 8(a) is an upper plan view showing a fourth embodiment of the present invention.
Figure 8B:
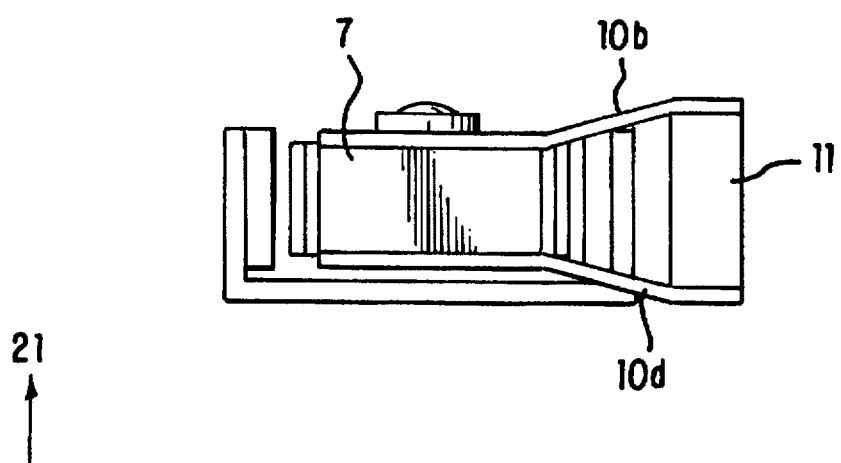
FIG. 8(b) is a side view showing the fourth embodiment of the present invention.

FIGS. 8(a) and 8(b) show a fourth embodiment of the present invention. Four plate springs 10a to 10d are secured with widths thereof directed in such a manner as to maintain angles 31a–31d with respect to a plane defined by a disk. The plate springs have portions of lengths thereof lying in a space between a holder 7 and a base 11, which portions are not parallel to a tangential direction (indicated by arrow 23) of the disk over a part or substantially the entirety of the space. As a result, those plate springs that are opposed to each other when viewed from above, as shown in FIG. 8(a), e.g., 10a and 10c are arranged in a substantially V-shaped pattern, and so are those plate springs that are opposed to each other when viewed from one side, as shown in FIG. 8(b)e.g., 10b and 10d. The above construction provides effects similar to those provided by the first embodiment. Although in the illustrated construction, the distance between the opposed plate springs is increased toward the base 11, similar effect may be provided when that distance is increased toward the holder 7 and decreased toward the base 11.

Although the above descriptions concern embodiments of optical component parts drive devices for optical recording and reproduction apparatus, the present invention may be applied to optical component parts drive devices for various apparatus, and still similar effects may be provided.

Figure 9A:
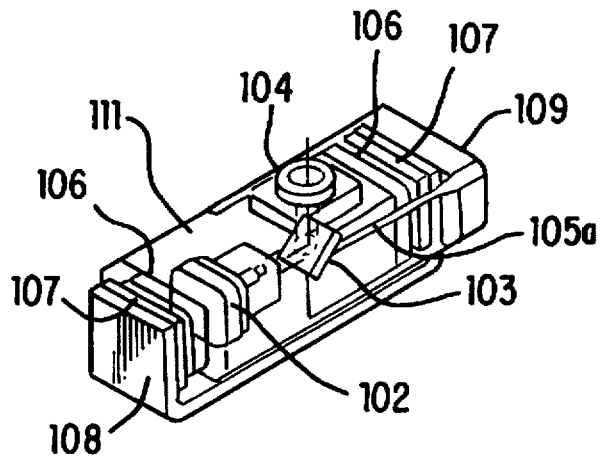
FIG. 9(a) is a perspective view showing a fifth embodiment of the present invention.

FIG. 9(a) schematically shows a fifth embodiment of the present invention. A fixing member 109 supports a mobile body 111, which has an optical unit 102, a reflection mechanism 103, a lens 104 and coils 106, through four plate springs 105a, 105b, 105c and 105d (these being shown in FIG. 9(b)) in such a manner as to allow movement of the mobile body. Light emitted from the optical unit 102 is directed by the reflection mechanism 103 toward the lens 104, transmits through the lens 104, and is condensed on a recording medium (not shown). Light reflected from the recording medium and indicating recorded information returns to the optical unit 102 by taking the above optical path in the reverse direction. An electrical signal is generated from light which has returned to the optical unit. On the basis of the electrical signal, the position of the mobile body is controlled by using electromagnetic force generated between the coils 106 and magnets 107 due to current flowing in the coil 106. As shown in FIG. 9(a), magnets 107 are mounted on element 108, which also acts as a fixing member, as well as a yoke for magnets 107.

Figure 10A:
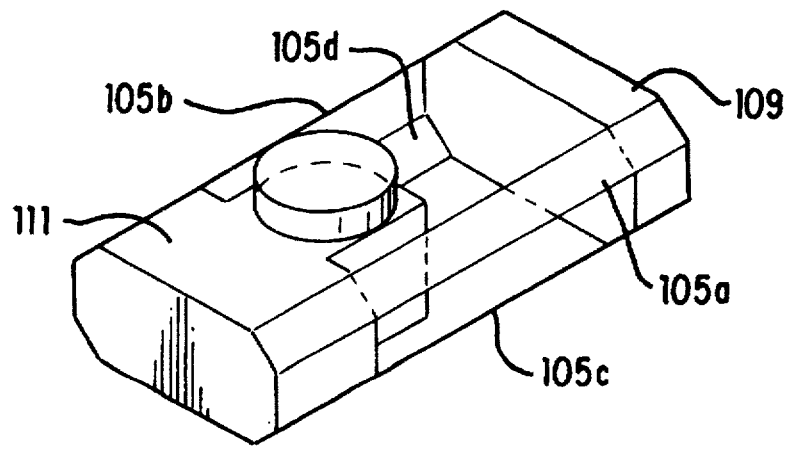
FIG. 10(a) is a view illustrating a stand-by state of the fifth embodiment of the present invention.
Figure 10B:
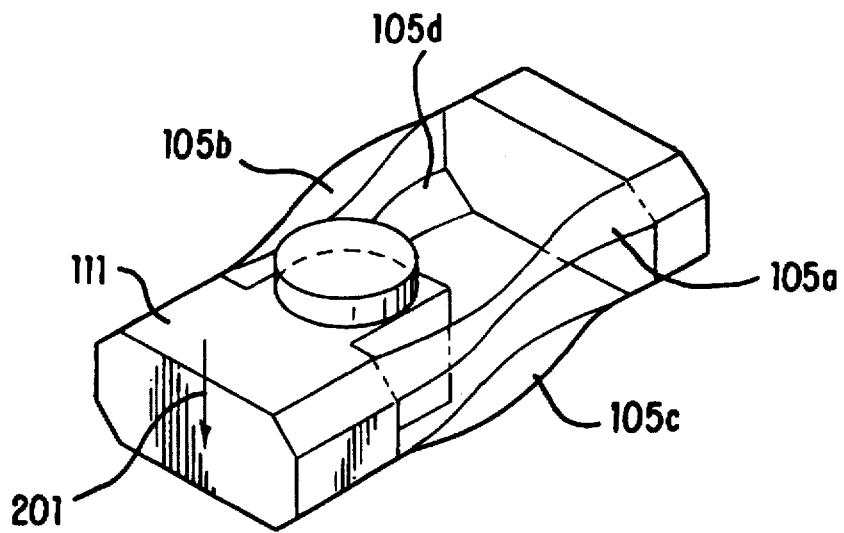
FIG. 10(b) is a view illustrating a deformed state of the fifth embodiment of the present invention.

FIGS. 10(a) and 10(b) are views illustrating this embodiment, the views depicting the embodiment schematically in order to illustrate the operation of the plate springs 105a–105d. FIG. 10(a) shows a state in a neutral position. In this state, the deformation of the plate springs 105a, 105b, 105c and 105d is small.

FIG. 10(b) shows a state of being displaced in one of the focusing and tracking directions in which the mobile body 111 is able to move, for example, be displaced in the direction indicated by an arrow 201. In this state, the plate springs 105a, 105b, 105c and 105d are deformed in a complex deformation mode including torsional deformation and deflectional deformation.

Figure 11:
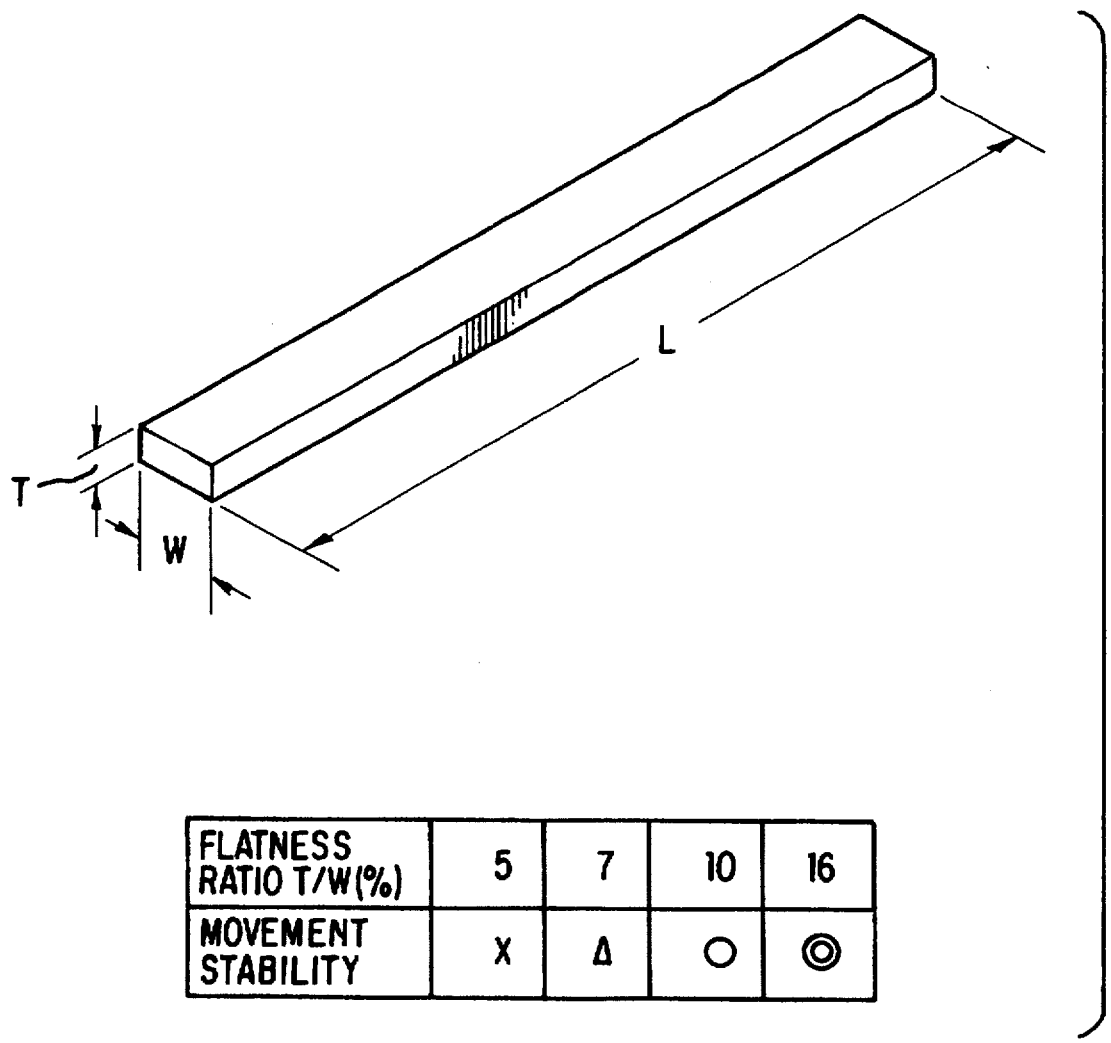
FIG. 11 is a view illustrating the flatness ratio of the present invention.

It has been found, in the production of this embodiment, that the behavior of a plate springs greatly varies depending on the width and thickness of the plate spring. Experiments have been conducted, finding that the behavior of a plate spring having a length L which is eight or more times a width W thereof, as shown in FIG. 11, is stable when the plate spring is configured to have a flatness ratio (i.e., the ratio (=T/W) of a thickness T of the plate spring with respect to the width W thereof) above 7%, whereas when the plate spring is configured to have a flatness ratio below 7%, the behavior of the plate spring is unstable. It has also been found that stability is greatly improved when the flatness ratio is above 16%, as shown in the Table in FIG. 11.

Figure 12A:
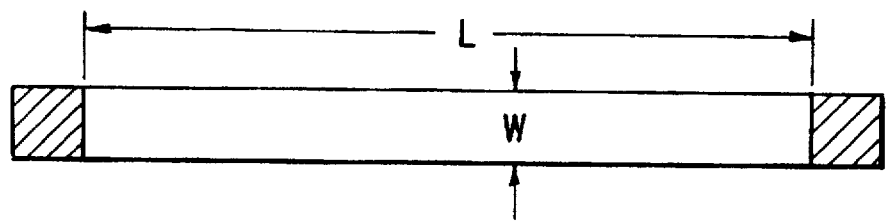
FIGS. 12(a), 12(b), 12(c) and 12(d) are views showing external appearances of modifications of plate springs of the present invention.

FIGS. 12(a) to 12(d) show various modifications of plate springs that may be used in this embodiment. The hatched portions indicate portions for mounting to the mobile body 111 and the fixing member 109. FIG. 12(a) shows a plate spring having a length L and a width W that satisfy the interrelationship shown in FIG. 11, this being the simplest among the modifications.

Figure 12B:
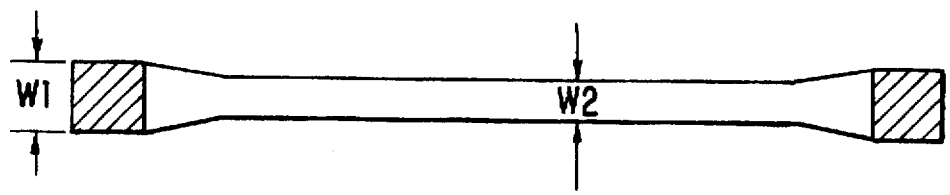

FIG. 12(b) shows a modification in which, while the mounting portions have a width W1, a central linear portion of the plate spring has a width W2 smaller than the width W1. This arrangement is effective for preventing unsatisfactory movement from being caused by a high rigidity of a plate spring when the plate spring is formed of a material having a relatively great thickness T. In this case, T/W2 is the flatness ratio that relates to the stability of behavior.

Figure 12C:
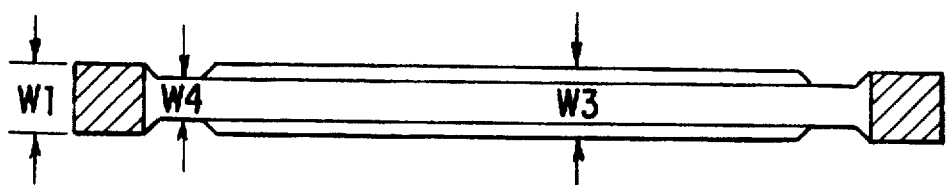

FIG. 12(c) shows a modification in which the plate spring has a central linear portion having a width W3, and also has portions the width of which is reduced from the width W3. This arrangement is effective for preventing unsatisfactory movement from being caused by a low rigidity of a plate spring when the plate spring is formed of a material having a relatively small thickness T. In this case, T/W4 is the flatness ratio that relates to the stability of behavior.

Figure 12D:
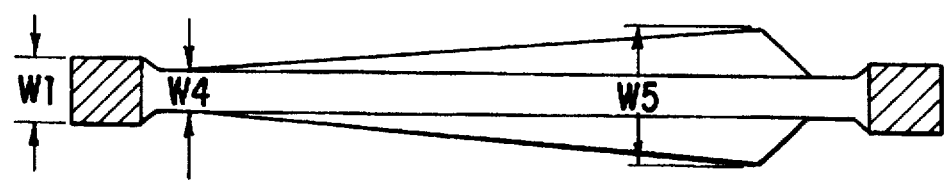

FIG. 12(d) shows a modification in which the plate spring has a central linear portion having a width of various values. That is, the width of the central portion changes gradually from a width W5 to a width W4. This arrangement serves to disperse the natural frequency of the plate spring, that is, to lower the peak of amplitude at the natural frequency, which is advantageous to control.

Figure 13:
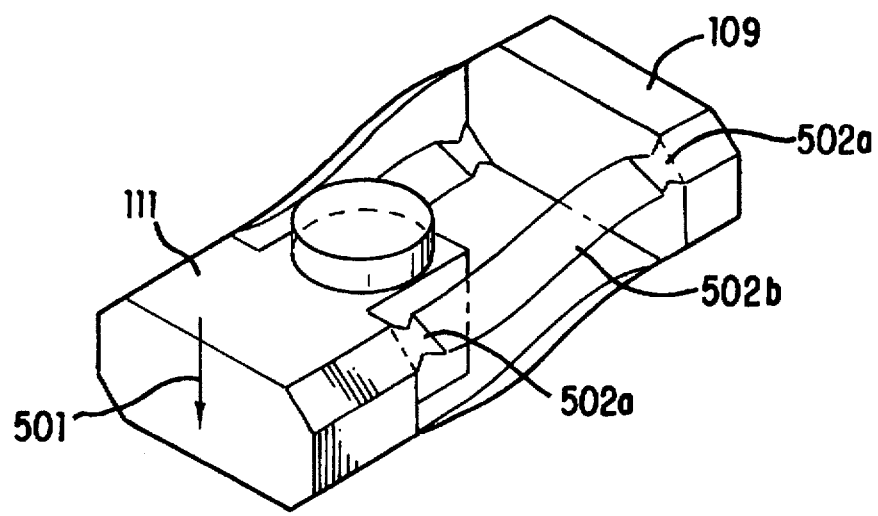
FIG. 13 is a view illustrating a modification of the fifth embodiment of the present invention.

FIG. 13 shows a modification of the fifth embodiment, in which plate springs of the type shown in FIG. 12(c) are combined. The drawing shows a state of being displaced in one of the focusing and tracking directions in which the mobile body 111 is able to move, for example, displaced in the direction indicated by an arrow 501. In this state, each plate spring undergoes torsional deformation in width reduced portions 502a and deflectional deformation in a central portion 502b. Thus, when a plate spring has width reduced portions at either end thereof, a dispersed-deformation mode is effected, in which movement is stabilized and the range of linear movement is widened. It has been confirmed, from the results of certain experiments, that relatively simple deflection rigidity has dominant influence on the natural frequency in this modification, and that deflection rigidity is the rigidity factor that requires consideration in design.

Figure 14A:
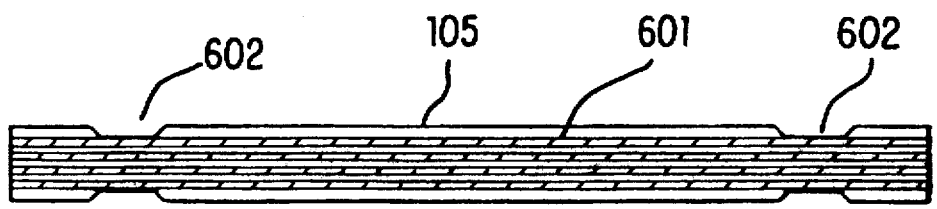
FIG. 14(a) is a view showing wiring in a plate spring of the present invention.
Figure 14B:
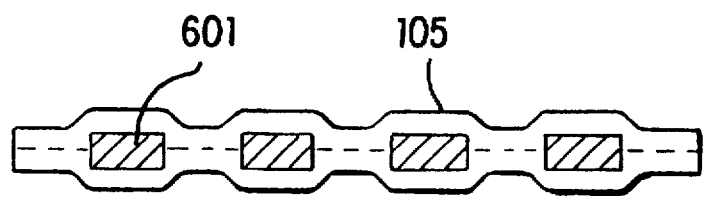
FIGS. 14(b) and 14(c) are sectional views of different types of plate springs of the present invention.

FIGS. 14(a) and 14(b) show an example of wiring arranged through the plate springs of this embodiment. As shown in FIG. 14(a), four wires 601 are arranged substantially parallel to each other in each of the plate springs 105 while extending from one end of the plate spring 105 to the other end. The wires are formed by etching a foil of a copper-alloy spring material containing beryllium, and have a substantially rectangular cross-sectional configuration, as shown in FIG. 14(b).

As shown in FIG. 14(b), the outer form of each plate spring 105 of this embodiment is produced by coating a polyimide resin on two opposed side surfaces of the wires. Regarding a material for this purpose, an insulating material, other than polyimide, may be used. Regarding a production method, a method comprising other than resin coating, such as a method comprising application of a sheet-shaped material or injection forming, may be used.

Figure 14C:
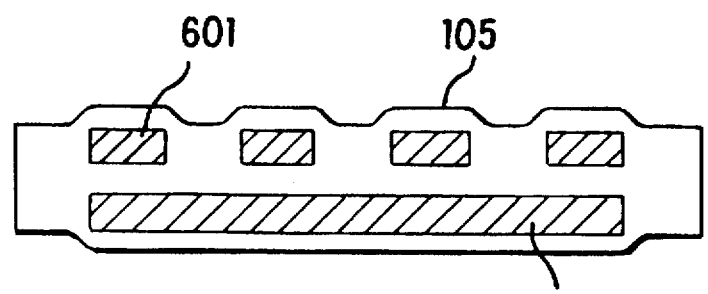

Another example is shown in FIG. 14(c). As shown in this drawing, it is possible to combine wires 601 in a layered structure with a wire, such as a wire 601a, having a different cross-sectional area.

With the arrangement of each plate spring 105 shown in FIG. 14(a), there is a risk that portions of wires 601 at the width reduced portions 602 may be exposed on those surface portions of the outer form at either end. However, since the four plate springs 105 are not disposed in contact with each other, no substantial problem arises from the above risk.

Figure 9B:
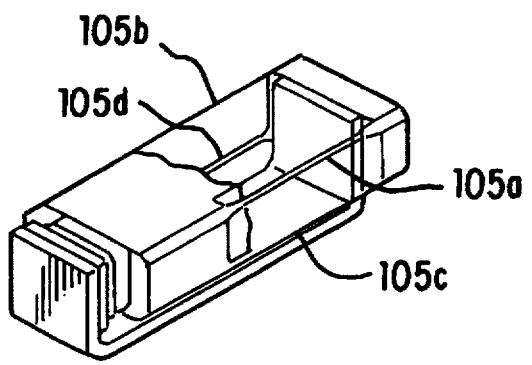
FIG. 9(b) is a partially cut-away perspective view of the fifth embodiment of the present invention.

In this embodiment, four wires 601 are disposed in each of the four plate springs 105a–105d, thereby disposing sixteen wires in total. As shown in FIG. 9(b), since the plate springs 105a, 105b, 105c and 105d are isolated from each other, electricity has a small influence between the plate springs. However, four wires 601 that are disposed in proximity to each other in each plate spring 105 are likely to be electrically influenced therebetween. In view of this fact, this embodiment is arranged such that a first line for conveying a received-light signal output from the optical unit 102, a second line for a light-source driving signal to be input to the optical unit 102, and a third line for a coil driving signal for supplying current to the coils 106 for driving the mobile body 101, that is, signal lines for conveying current of different levels, are not provided in a single plate spring. Specifically, wires forming a received-light signal line are all disposed in the plate springs 105c and 105d, wires forming a light-source driving signal line are all disposed in the plate spring 105b, and wires forming a coil driving signal line are all disposed in the plate spring 105a. When signal lines are thus arranged, it is possible to realize stable control operations.

Figure 15A:
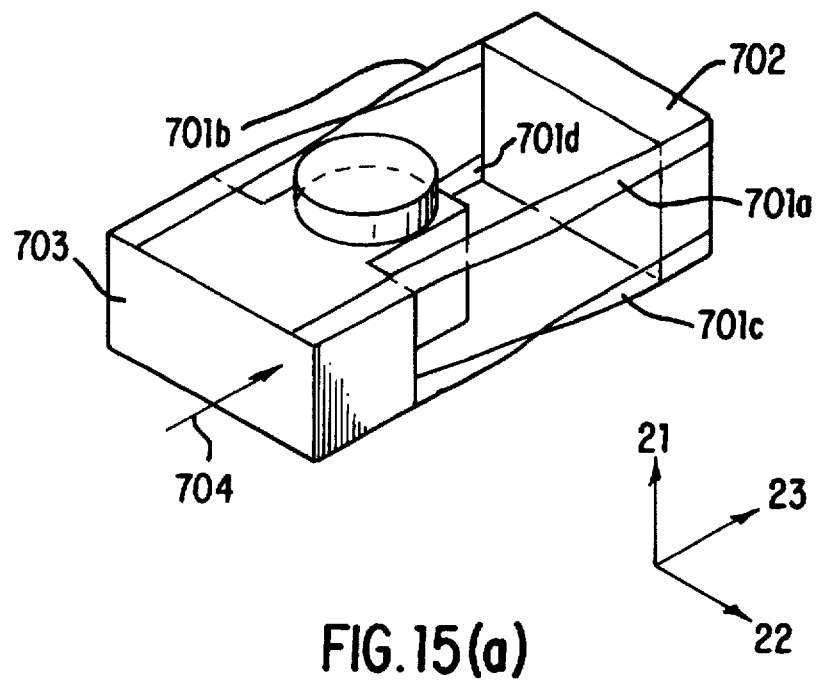
FIGS. 15(a) and 15(b) are views illustrating a sixth embodiment of the present invention.
Figure 15B:
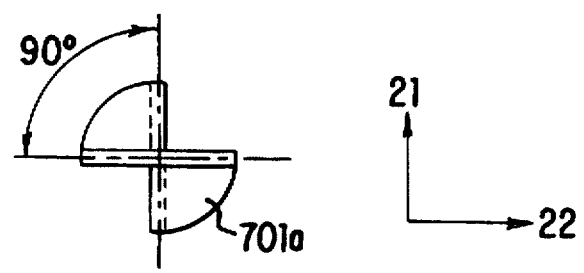

FIGS. 15(a) and 15(b) show a sixth embodiment of the present invention. As shown in FIG. 15(a), plate springs 701a to 701d of this embodiment cooperate with a fixing member 702 to support a mobile body 703 in such a manner that the mobile body is able to move in two directions comprising a focusing direction (indicated by an arrow 21) and a tracking direction (indicated by an arrow 22).

This embodiment is distinguished from the foregoing embodiments in the manner in which the plate springs 701a to 701d are mounted. Those end portions of the plate springs 701a to 701d close to the fixing member 702 are fixed to surfaces of the fixing member 702 that are perpendicular to the tracking direction, the plate springs 701a to 701d extended from the fixing member 702 to the mobile body 703 while twisting by approximately 90°, and the plate springs 701a to 701d have the other end portions fixed to surfaces of the mobile body 703 which are perpendicular to the focusing direction. The twisting of the plate spring 701a has the shape shown in FIG. 15(b) when viewed from the direction indicated by an arrow 704.

Thus, in this embodiment, the four plate springs 701a to 701d are arranged such that the plate springs have first symmetrical surfaces that are perpendicular to the tracking direction, and second symmetrical surfaces that are perpendicular to the focusing direction.

Figure 16A:
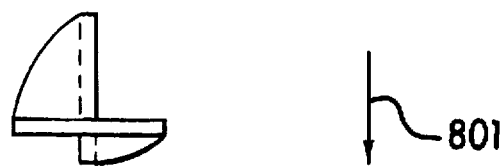
FIGS. 16(a), 16(b) and 16(c) are views illustrating the operation of the sixth embodiment of the present invention.
Figure 16B:
Figure 16C:
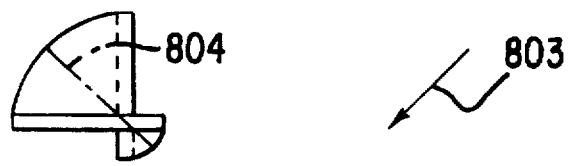

FIGS. 16(a) to 16(c) are views illustrating the operation of this embodiment. FIGS. 16(a) to 16(c) show different states of the plate spring 701a when the end portion thereof that is close to the mobile body 703 is displaced in directions indicated by arrows 801, 802 and 803, respectively, with the other end portion of the plate spring being fixed to the fixing member 702.

When the plate spring 701a is displaced in the direction indicated by the arrow 801, the plate spring undergoes deflectional deformation mainly in the vicinity of the end portion close to the mobile body 703. When displaced in the direction indicated by the arrow 802, the plate spring 701a undergoes deflectional deformation mainly in the vicinity of the end portion close to the fixing member 702. When displaced in the direction indicated by the arrow 803, the plate spring 701a undergoes deflectional deformation mainly in the vicinity of a central portion, indicated by a displacement position 804. Thus, each of the plate springs 701a and 701d has portions capable of undergoing plane deformation in every direction within a plane defined by the focusing and tracking directions in which the mobile body 703 is able to move. Therefore, it is possible to drive the mobile body 703 with a small driving force, and to obtain isotropic performance.

A manner of mounting the plate springs 701a to 701d, which is different from that shown in FIGS. 15(a) and 15(b), is possible. That is, those end portions of the plate springs 701a to 701d close to the fixing member 702 may be fixed to surfaces of the fixing member 702 that are perpendicular to the focusing direction, with the other end portions of the plate springs 701a to 701d being fixed to surfaces of the mobile body 703 that are perpendicular to the tracking direction. This arrangement provides a similar effect.

A similar effect may be obtained when the plate springs are disposed as shown in FIGS. 8a and 8b, in which the distance between opposed plate springs is increased toward the base 11 (toward the fixing member 702, in this embodiment).

Figure 17A:
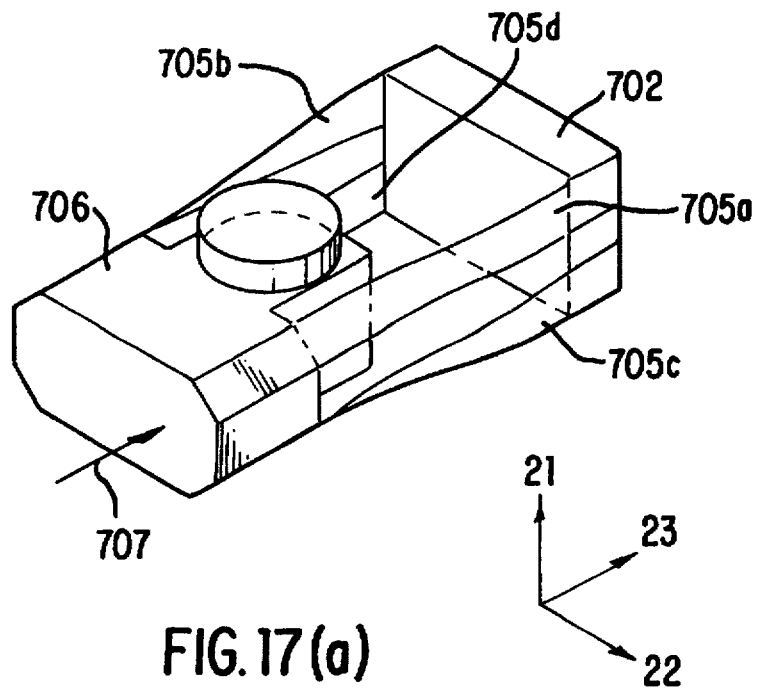
FIGS. 17(a) and 17(b) are views illustrating a seventh embodiment of the present invention.
Figure 17B:
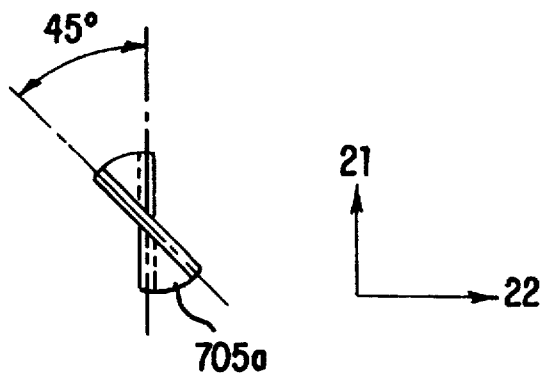

FIGS. 17(a) and 17(b) show a seventh embodiment of the present invention. In contrast with the sixth embodiment in which the plate springs 701a to 701d are twisted by approximately 90°, the seventh embodiment is characterized in that a twist angle smaller than 90° is adopted. An example of a twist angle shown by the embodiment being illustrated is 45°. However, any suitable angle may be selected in accordance with necessity of control.

Those end portions of plate springs 705a to 705d close to a fixing member 702 are fixed to surfaces of the fixing member 702 that are perpendicular to a tracking direction, the plate springs 705a to 705d extended from the fixing member 702 to a mobile body 706 while twisting by approximately 45°, and the plate springs 705a to 705d have the other end portions fixed to surfaces of the mobile body 706 that form an angle of approximately 45° with respect to a plane perpendicular to a focusing direction and that are parallel with a tangential direction (indicated by an arrow 23) of the relevant disk. The twisting of the plate spring 705a has the shape shown in FIG. 17(b) when viewed from the direction indicated by an arrow 707. Twisting in the opposite direction provides similar effect.

Adopting the above arrangement and setting the twist angle to a desired value, makes it possible to easily balance the driving system and the rigidity of the supporting system, thereby making it possible to perform optimum control.

A similar effect is provided when those end portions of plate springs 705a to 705d close to the fixing member 702 are fixed to surfaces of the fixing member 702 that are perpendicular to the focusing direction while the other end portions of the plate springs 705a to 705d are fixed to surfaces of the mobile body 706 that form a desired angle with respect to a plane perpendicular to the focusing direction and that are parallel with the tangential direction (indicated by the arrow 23) of the disk.

A similar effect also is provided when those end portions of plate springs 705a to 705d close to the mobile body 706 are fixed to surfaces of the mobile body 706 that are perpendicular to either the focusing direction or the tracking direction while the other end portions of the plate springs 705a to 705d are fixed to surfaces of the fixing member 702 that form a desired angle with respect to a plane perpendicular to the focusing direction and that are parallel with the tangential direction (indicated by the arrow 23) of the disk.

Figure 18A:
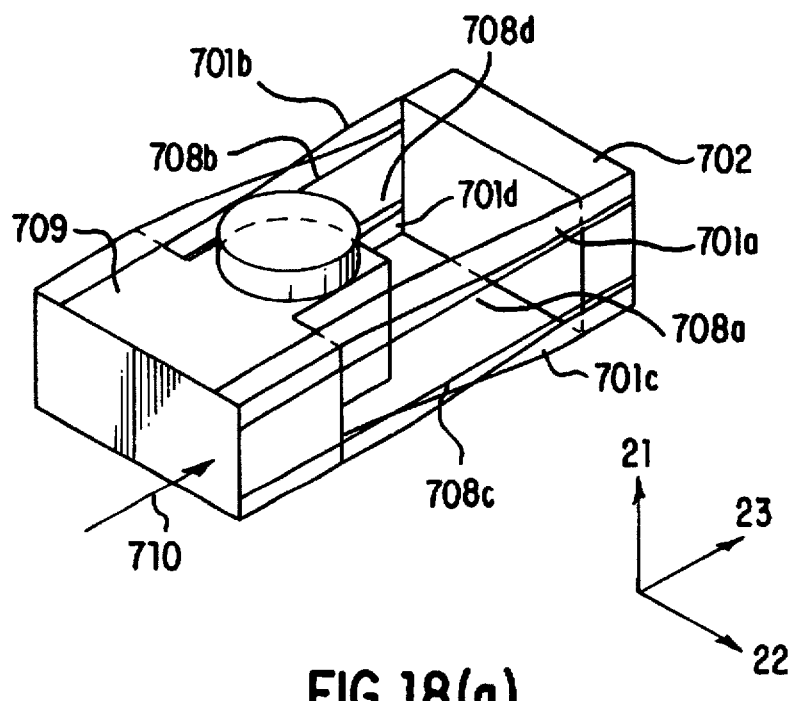
FIG. 18(a) is a view illustrating an eighth embodiment of the present invention.
Figure 18B:
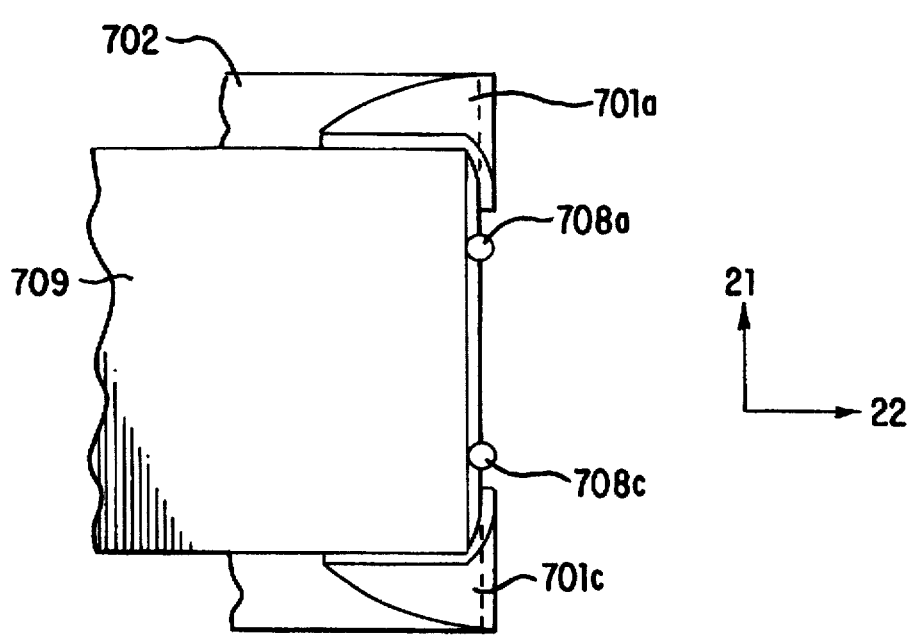
FIG. 18(b) is a fragmentary enlarged view of the eighth embodiment of the present invention.

FIGS. 18(a) and 18(b) show an eighth embodiment of the present invention. This embodiment is characterized in that, in contrast with the sixth embodiment having isotropic performance, wires 708a to 708b are added as reinforcing members so as to increase rigidity.

As shown in FIG. 18(a), those end portions of plate springs 701a to 701d close to a fixing member 702 are fixed to surfaces of the fixing member 702 that are perpendicular to a tracking direction, the plate springs extended from the fixing member 702 to a mobile body 709 while twisting by approximately 90°, and the plate springs have the other end portions fixed to surfaces of the mobile body 709 that are perpendicular to a focusing direction.

The wires 708a to 708d have their end portions close to the fixing member 702 fixed to surface of the fixing member 702 that are perpendicular to the tracking direction, with the other end portions being fixed to surfaces of the mobile body 709 that are perpendicular to the tracking direction. The wires 708a to 708d are parallel to each other and also are parallel to a tangential direction of the relevant medium. Similarly to the plate springs 701a to 701d, these wires have isotropic rigidity with respect to every direction within a plane defined by the focusing and tracking directions in which the mobile body 709 is able to move.

FIG. 18(b) is a fragmentary enlarged view of this embodiment, taken from the direction indicated by an arrow 710. This drawing shows the positional relationship between the plate springs 701a and 701c, and the wires 708a and 708c.

Adopting the above arrangement enables a standard material, which is advantageous in terms of costs, to be selected for plate springs that also serve to provide electrical wiring, and also enables desired rigidity to be obtained by the use of inexpensive wires.

Figure 19A:
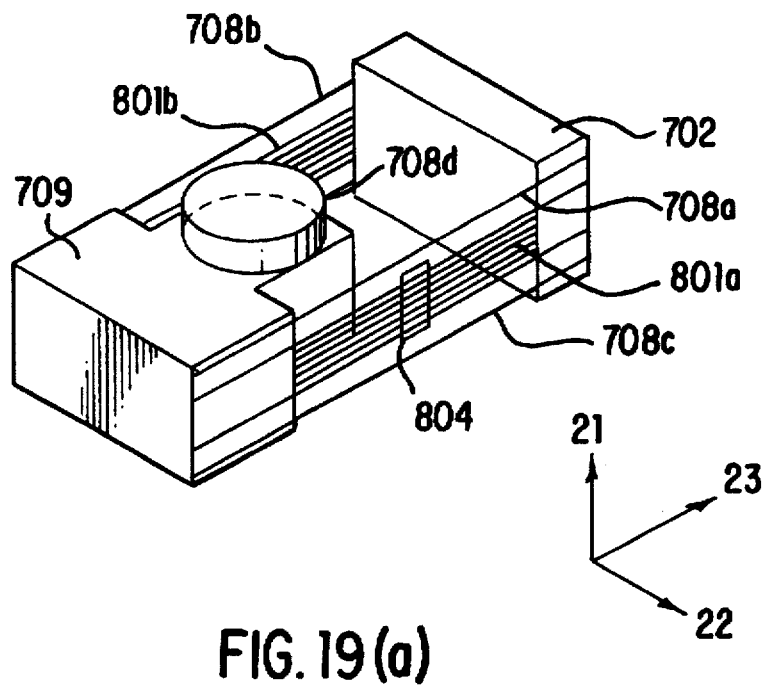
FIGS. 19(a) and 19(b) are views illustrating a ninth embodiment of the present invention.
Figure 19B:
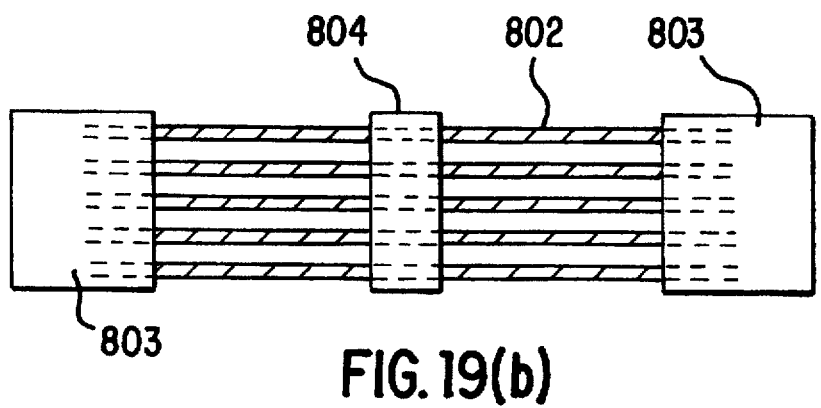

FIGS. 19(a) and 19(b) show a ninth embodiment of the present invention. In this embodiment, four wires 708a to 708d support a mobile body 709 in such a manner as to allow movement of the mobile body, and wiring elements 801a and wiring elements 801b are disposed at locations on two opposed side surfaces of the mobile body 709. In this arrangement, it is desired, from the viewpoint of stability of moving performance, that the wiring elements have a sufficiently smaller elasticity than that of the wires.

The wiring elements in this embodiment are such that, as shown in FIG. 19(b), first ends of a plurality of wires 802 and second ends of the same are individually integrated by insulators 803, and that intermediate insulators 804 are provided at intermediate positions, thereby preventing contact between the wires while realizing a low elasticity. Each wire 802 may be coated with another insulator, as in the case of a coated copper wire, so long as the wire has a desired cross-sectional configuration. Further, each wire 802 may be made of an electrically conductive material. However, in order to improve durability, a copper-containing spring material, such as beryllium copper, is preferable.

A material having viscosity, such as rubber, is used to form the intermediate insulators 804, so as to damp vibration to thereby improve movement stability.

If the intermediate insulators 804 are made of a viscous material having an even lower elasticity, the entire surface of the wires 802 may be covered.

Next, signals will be described. In this embodiment, a line for a driving signal to be supplied to a driving means (not shown) for driving the mobile body 709, and a line for a driving signal to be supplied to a light-emitting means (not shown) within the mobile body 709 are formed in the wiring means 801a. On the other hand, a line for a signal from a light-receiving means (not shown) within the mobile body 709 is formed in the wiring means 801b. Thus, noise in a signal, particularly a signal from the light-receiving means, is reduced.

As has been described above, according to the present invention, plate springs have widths angled with respect to a plane defined by a surface of a disk, so that a simple construction enables a mobile body to be displaced in two directions comprising a focusing direction and a tracking direction. This arrangement makes intermediary supporting members unnecessary, and realizes a simple construction of an optical component parts drive device.

When plate springs serving as supporting means also serve to provide an electric wiring function, it is possible to eliminate a wiring system, which has been necessary as a system separate from a supporting system. This is very advantageous in terms of costs.

When plate springs are used in their twisted position, it is possible to easily change characteristics, such as to reduce rigidity or to impart isotropic property to rigidity, in accordance with the aim of control. Thus, an optical component parts drive device is capable of realizing optimum control, and capable of being applied to a wide variety of apparatus.

What is claimed is:

1. An optical component drive device including:
   a mobile body having optical component parts for radiating a light spot onto a recording surface of a disk on which information is recorded, and also having a holder retaining said optical component parts;

driving means for driving said mobile body in two directions comprising a radial direction of the disk and a direction perpendicular to a plane defined by the surface of the disk; and supporting means for supporting said mobile body so that said mobile body is movable in said two directions, said supporting means comprising at least two elastic plates, each elastic plate having at least two surfaces including a first surface that meets a second surface at an edge that extends along a lengthwise direction of the respective plate, the entire edge of each plate being parallel with the plane defined by the disk surface, the first and second surfaces of each plate not being parallel with the plane defined by the disk surface, wherein said plates are joined to said mobile body on first joint surfaces and joined to a fixing member on second joint surfaces.

2. An optical component drive device according to claim 1, wherein said plates have widths directed at substantially equal angles with respect to said plane defined by the disk surface.

3. An optical component drive device according to claim 1, wherein said plates are joined to said mobile body on first joint surfaces of said mobile body and joined to a fixing member on second joint surfaces of said fixing member that are not parallel with said first joint surfaces, whereby said plates twist.

4. An optical component drive device according to claim 1, further including a damping member attached to at least a part of said plates.

5. An optical component drive device according to claim 4, wherein said damping member is formed of a material selected from the group consisting essentially of silicone rubber, natural rubber, butyl rubber, and ether-containing polyurethane.

6. An optical component drive device according to claim 1, wherein each of said plates satisfies a ratio of a thickness thereof with respect to a width thereof, said ratio being not less than 7%.

7. An optical component drive device according to claim 6, wherein each of said plates has at least one portion having a reduced width.

8. An optical component drive device according to claim 7, wherein each of said plates has at least two said portions with a reduced width located at either end portion of each plate in a vicinity of locations at which the plate is mounted to said mobile body and to a fixing member.

9. An optical component drive device according to claim 1, wherein said supporting means has first surfaces symmetrically arranged relative to a plane defined by a light path that extends from a light source to a mirror and a light path from said mirror to the surface of the recording medium.

10. An optical component drive device according to claim 9, wherein said supporting means has second symmetrical surfaces perpendicular to the first symmetrical surfaces.

11. An optical component drive device according to claim 1, wherein said supporting means comprises said plates and at least four reinforcing member.

12. An optical component drive device according to claim 1, wherein said at least two elastic plates each have a rectangular cross-section.

13. An optical component drive device according to claim 1, wherein said at least two elastic plates are arranged at an angle between 0° and 90° relative to the plane defined by the disk surface.

14. An optical component drive device according to claim 13, wherein said angle is from about 25° to about 65°.

15. An optical component drive device according to claim 1, wherein there are two said elastic plates, each of said two elastic plates including two elongated elastic members joined to one another by a connecting portion.

16. An optical component drive device according to claim 1, wherein said at least two elastic plates comprise four elastic plates attached to respective corners of said mobile body.

17. An optical component drive device according to claim 16, wherein each of said four elastic plates includes two elastic members, a first one of said elastic members extending from a first side of said mobile body, a second one of said elastic members extending from a second side of said mobile body that is opposite from said first side of said mobile body.

18. An optical component drive device according to claim 1, wherein each of said plates has a length and a width, said length being at least eight times greater than said width.

19. An optical component parts drive device including:

a mobile body having optical component parts at least including light-emitting means, light-receiving means and light-condensing means for radiating a light spot onto a recording surface of a disk on which information is recorded, and also having a holder retaining said optical component parts;

driving means for driving said mobile body in two directions comprising a radial direction of the disk and a direction perpendicular to a plane defined by the surface of the disk; and supporting means for supporting said mobile body so that said mobile body is movable in said two directions, said supporting means comprising at least four plates that have elasticity and viscosity, each elastic plate having at least two surfaces including a first surface that meets a second surface at an edge that extends along a lengthwise direction of the respective plate, the entire edge of each plate being parallel with the plane defined by the disk surface, the first and second surfaces of each plate not being parallel with the plane defined by the disk surface, said plates having a plurality of wires with first ends that are electrically connected to said light-emitting means and to said light-receiving means as well as to said driving means, and with second ends that are electrically connected to an external circuit on an outside of said optical component drive device, wherein said plates are joined to said mobile body on first joint surfaces and joined to a fixing member on second joint surfaces.

20. An optical component drive device comprising:

a mobile body including a holder and a lens mounted to said holder, said lens focusing light on a surface of a disk on which information is recorded;

a drive unit engaged with said mobile body, said drive unit driving said mobile body in two directions comprising a first direction parallel to a plane defined by the surface, and a second direction perpendicular to said first direction; and at least two elastic plates engaged with said mobile body, said at least two elastic plates having widths, thicknesses, and side surfaces, said widths being greater than said thicknesses and arranged so as not to be parallel with said plane, each elastic plate having at least two surfaces including a first surface that meets a second surface at an edge that extends along a lengthwise direction of the respective plate, the entire edge of each plate being parallel with the plane, the first and second surfaces of each plate not being parallel with the plane, wherein said plates are joined to said mobile body on first joint surface and joined to a fixing member on second joint surfaces.

21. An optical component drive device according to claim 20, wherein first portions of said elastic plates are engaged with said mobile body, and second portions of said elastic plates are engaged with a fixed member.

22. An optical component drive device according to claim 20, wherein said at least two elastic plates comprise four elastic plates attached to respective corners of said mobile body.

23. An optical component drive device according to claim 22, further comprising a damping member attached to each of said elastic plates.

24. An optical component drive device according to claim 22, wherein a ratio between the thickness and the width of each of said elastic plates is not less than 7%.

25. An optical component drive device according to claim 22, wherein each of said elastic plates has at least one portion having a reduced width.

26. An optical component drive device according to claim 25, wherein each of said elastic plates has two of said reduced width portions, located near opposite ends of said elastic plates.

27. An optical component drive device according to claim 22, wherein said elastic plates are arranged at an angle between 0° and 90° relative to said plane defined by said surface.

28. An optical component drive device according to claim 27, wherein said angle is from about 25° to about 65°.

29. An optical component drive device according to claim 20, further comprising electrically conductive wires attached to said at least two elastic plates, an end of said wires coupled to said drive unit.

30. An optical component drive device according to claim 20, wherein each of said at least two elastic plates includes a twist so as to be non-planar.

31. An optical component drive device according to claim 20, further comprising a light source mounted to said holder, a light diffractor mounted to said holder, said light source emitting a beam of light through said light diffractor and said lens.

32. Apparatus comprising:

a mobile body including a holder and a lens mounted to said holder, said lens focusing light on a surface of a disk on which information is recorded;

a base member; and at least two elongated plate springs attached between said mobile body and said base member so that said mobile body is movable relative to said base member in two directions comprising a first direction parallel to a plane defined by the surface, and a second direction perpendicular to said first direction, each of said plate springs having a width, a thickness, and side surfaces, said width being greater than said thickness and arranged so as not to be parallel with said plane, each elastic plate having at least two surfaces including a first surface that meets a second surface at an edge that extends along a lengthwise direction of the respective plate, the entire edge of each plate being parallel with the plane, the first and second surfaces of each plate not being parallel with the plane, wherein said plates are joined to said mobile body on first joint surfaces and joined to a fixing member on second joint surfaces.

33. Apparatus according to claim 32, wherein said at least two plate springs comprise four plate springs.

34. Apparatus according to claim 33, wherein said four plate springs are attached between respective corners of said mobile body and said base member.

35. Apparatus according to claim 33, wherein said four plate springs comprise two pairs of plate springs, each pair including two of said plate springs attached by a connecting portion.

36. Apparatus according to claim 33, wherein each of said four plate springs includes a twist so as to be non-planar.

37. Apparatus according to claim 32, further comprising a damping member attached to each of said plate springs.

38. Apparatus according to claim 32, wherein a ratio between the thickness and the width of each of said plate springs is not less that 7%.

39. Apparatus according to claim 32, wherein each of said plate springs has at least one portion having a reduced width.

40. Apparatus according to claim 39, wherein each of said plate springs has two of said reduced width portions, located near opposite ends of said plate springs.

41. Apparatus according to claim 32, further comprising electrically conductive wires attached to said at least two plate springs and extending from said mobile body to said base member.

42. Apparatus according to claim 32, wherein said plate springs are arranged at an angle between 0° and 90° relative to said plane.

43. Apparatus according to claim 42, wherein said angle is from about 25° to about 65°.

44. Apparatus according to claim 32, wherein each of said at least two plate springs includes a twist so as to be non-planar.

45. Apparatus according to claim 32, further comprising a light source mounted to said holder, a light diffractor mounted to said holder between said light source and said lens, said light source emitting a beam of light through said light diffractor and said lens.

46. Apparatus according to claim 32, further comprising a drive unit engaged with said mobile body, said drive unit driving said mobile body in said first and said second directions.

* * * * *

UNITED STATES PATENT AND TRADEMARK OFFICE
CERTIFICATE OF CORRECTION

PATENT NO. : 5,790,510
APPLICATION NO. : 08/683360
DATED : August 4, 1998
INVENTOR(S) : Hirokazu Itoh et al.

Page 1 of 1

It is certified that error appears in the above-identified patent and that said Letters Patent is hereby corrected as shown below:

On the front page, section 56, insert --01-118224 5/1989 Japan--, therefor.

On the front page, section 56, insert --58-050336 3/1983 Japan--, therefor.

On the front page, section 56, insert --02-005117 1/1990 Japan--, therefor.

On the front page, section 56, insert --60-001630 1/1985 Japan--, therefor.

On the front page, section 56, insert --60-246032 12/1985 Japan--, therefor.

On the front page, section 56, insert --01-154520 10/1989 Japan--, therefor.

On the front page, section 56, insert --60-123724 8/1985 Japan--, therefor.

Signed and Sealed this

Twenty-eighth Day of September, 2010

David J. Kappos
*Director of the United States Patent and Trademark Office*